United States Patent [19]
Hartington

[11] Patent Number: 5,564,349
[45] Date of Patent: Oct. 15, 1996

[54] APPARATUS FOR SHOOTING WHOLE AUTOMOBILE TIRES INTO A KILN

[75] Inventor: Hans H. Hartington, Copenhagen, Denmark

[73] Assignee: F.L. Smidth & Co. A/S, Denmark

[21] Appl. No.: 372,596

[22] Filed: Jan. 13, 1995

[30] Foreign Application Priority Data

Jan. 24, 1994 [DK] Denmark .................. 0102/94

[51] Int. Cl.[6] .................. A47J 36/00; B23K 3/02
[52] U.S. Cl. .................. 110/246; 110/226; 432/105; 432/106
[58] Field of Search .................. 110/226, 229, 110/227, 228, 246, 255, 346; 432/105, 106, 108, 117, 121, 239

[56] References Cited

U.S. PATENT DOCUMENTS 5,086,716  2/1992  Lafser, Jr. .................. 110/246 X

FOREIGN PATENT DOCUMENTS 0382673  8/1990  European Pat. Off. .

Primary Examiner—Henry A. Bennett
Assistant Examiner—Susanne C. Tinker
Attorney, Agent, or Firm—Brumbaugh, Graves, Donohue & Raymond

[57] ABSTRACT

A description is given of an apparatus for shooting of whole automobile tires, preferably into a cement rotary kiln, which apparatus comprises a gun barrel, a charging device for placing automobile tires in the gun barrel, and a device for generating compressed air for propelling the automobile tire through the gun barrel. The gun barrel consists of a tube having a cross-section which is essentially rectangular over its entire length. By designing the gun barrel with a cross-section which corresponds to the cross-section of the automobile tire, the automobile tire will fill out the entire cross-sectional area of the gun barrel thereby making it possible to provide an air pressure behind the automobile tire which is sufficient for propelling the tire through the gun barrel.

20 Claims, 2 Drawing Sheets

APPARATUS FOR SHOOTING WHOLE AUTOMOBILE TIRES INTO A KILN

BACKGROUND OF THE INVENTION

The present invention relates to an apparatus for shooting of whole automobile tires, preferably into a cement rotary kiln, which apparatus comprises a gun barrel with a tire feed end and a tire shooting end, a charging device for placing automobile tires in the tire feed end of the gun barrel, and a device for generating compressed air for propelling the automobile tire through the gun barrel.

It is known practice from European patent specification No. 0382673 to utilize a pneumatic gun for shooting of drums containing waste material into the burning zone of a rotary kiln. This known gun is designed for shooting of difficult-to-handle waste products which exist in solid, particle and/or sludge form, and, for this reason, they are encapsulated in drums prior to the shooting. In the event that this known gun were to be used for shooting automobile tires, it would be necessary as a first step, because of the peculiar geometry of the tires, to cut the tires into shreds, subsequently pouring the shredded pieces into drums. In practice, such a preliminary treatment of the automobile tires would entail heavy costs, hence eliminating the incentive for using automobile tires as a fuel.

SUMMARY OF THE INVENTION

It is the objective of the present invention to provide an apparatus by means of which it is possible to shoot whole tires, for example into a cement rotary kiln.

According to the invention this is achieved by an apparatus of the kind mentioned in the introduction and being characterized in that the gun barrel consists of a tube having a cross-section which is essentially rectangular over its entire length.

By designing the gun barrel with a rectangular cross-section so that it matches the shape of a horizontally positioned automobile tire, the outline of which, viewed in the direction of its tread surface, describes a rectangle, the automobile tire which is to be shot will essentially fill out the entire cross-sectional area of the gun barrel thereby making it possible to provide an air pressure behind the automobile tire which is sufficient for propelling the tire through the gun barrel.

It is envisaged that the apparatus be used for shooting automobile tires of different sizes, e.g. tires from passenger cars and smaller trucks which normally have a diameter ranging between 400 and 900 mm and a width ranging from 125 to 350 mm. The apparatus may, however, also be dimensioned for shooting larger tires, such as tractor tires and the like. In order that the apparatus can be used in optimum manner for shooting automobile tires of different sizes, it has, in actual practice, proved to be an advantage if the gun barrel is wider in the tire feed end than in the tire shooting end.

It is therefore preferred that the gun barrel be divided into a first section at the tire feed end with the largest cross-sectional width, a second intermediate section where the cross-sectional width be reduced, and a third section at the tire shooting end with the smallest cross-sectional width.

More specifically, it has been ascertained that the feed end should be dimensioned with a width which is between 2 and 20 per cent smaller than the largest tire diameter which is to be handled, and that the shooting end should be dimensioned with a width which is between 2 and 20 per cent smaller than the smallest tire diameter which is to be handled. This will ensure that a sufficient air pressure for propelling the tire can be generated even for the smallest tire sizes. Also, a favorable control of the tire in the shooting end is ensured since the tire, because of the compression hereof, is in close contact with the side walls of the gun barrel which function as guiding surfaces.

While it is preferred that the width of the barrel be narrower at the shooting end than at the feed end, it is also contemplated that the side walls of the barrel be substantially parallel over their respective lengths. In order that sufficient air pressure can be generated which such a configuration, the width of the barrel should be less than the diameter of the tire. In this regard, it is preferred that the barrel width/tire diameter ratio be on the order of 1:2.

Since the compression of the diameter of the tire in the barrel will tend to cause an increase in the width of the tire, it is also preferred that the distance between the bottom wall and ceiling of the barrel be greater than the width of the uncompressed tire to be handled. A gap of from 5 to 15 mm prior to compression is preferred.

In order that the apparatus can be adapted in the best possible manner for shooting automobile tires of different diameters, at least one of the side walls of the gun barrel may be movable for adjusting the width of the gun barrel. It is further preferred that the ceiling of the gun barrel is movable so that the height of the gun barrel can be adapted to automobile tires of different widths. It has proved to be advantageous if the ceiling of the gun barrel is adjusted so that there is a small clearance between the ceiling and the tire, since, otherwise, there may be a tendency for the tire to get stuck in the gun barrel. Therefore, it is preferred that the apparatus incorporates means for adjusting the sides, and possibly the ceiling, of the gun barrel, which means may take the form of self-locking spindle gears, hydraulic cylinders or the like.

In practice, it has proved advantageous if the gun barrel is internally lubricated with an appropriate lubricant after every shooting cycle, and it is therefore preferred that the apparatus comprises a number of means such as nozzles for introducing such a lubricant, such as oil emulsion, soapy water or the like, into the gun barrel.

For optimizing the control of the tire shooting process both in terms of adapting the gun barrel to the particular tire which is to be shot and as regards the velocity at which the tire is leaving the gun barrel, exact knowledge of the tire characteristics is required. It is therefore preferred that the apparatus comprises a device for weighing and measuring the tire before it is loaded in the gun barrel. If the apparatus is used for shooting automobile tires into a cement rotary kiln, the information obtained from the weighing and measuring device may also be used in connection with the process control calculations of the fuel consumption and the chemical composition of the cement clinker.

A tire can be loaded in the apparatus in a number of conceivable ways. A case in point is an embodiment where the charging device comprises a supporting device and a pushing means which is movable between a charging position where an automobile tire, possibly by means of a propelling means, is transferred to the supporting device and a shooting position where the apparatus is ready for shooting and with the pushing means being a part of the side wall of the gun barrel.

The supporting device may be composed of a stationary surface, a belt conveyor, a gravity conveyor or the like, whereas the pushing means may consist of a plate which is moved forwards and backwards by means of, for example, a pneumatic or hydraulic cylinder.

It is the intention that the apparatus according to the invention be used for shooting whole automobile tires into cement rotary kilns, whether of the dry-process or wet-process type. It is a well-known fact that a cement rotary kiln consists of a long, rotating and slightly inclined tube with an upper material inlet end and a lower fuel firing end. The kiln typically has a number of different temperature zones which, when viewed from the material inlet end, are designated as the drying zone (wet-process kilns only), calcining zone, burning zone and cooling zone. To ensure that formation of detrimental substances during the tire incineration process is minimized, the tires must preferably be shot into the calcining zone of the kiln at a location which ensures that the retention time of the tires in this zone is sufficient for total incineration of the tires to be achieved before they reach the burning zone.

The apparatus may optionally be installed at one of the ends of the rotary kiln, but, for reasons of space, it is preferred that the apparatus is installed at the fuel firing end. In this case, the tires must, as a rule of thumb, be shot 6–8 times the nominal kiln diameter into the kiln in order to land in the calcining zone where the temperature typically ranges between 900 and 1300° C. In order to ensure this capability, the gun barrel of the apparatus is so positioned relative to the kiln that the tires can be shot ballistically. The shooting velocity must typically be in the range of 40–70 m/s.

The pressure required to shoot a tire the desired distance into the kiln will depend upon a number of factors, among which are the dimensions and weight of the tire, the dimensions of the barrel, and the presence and type of lubricant. Typically, air pressure in the range of from about one to ten bars will suffice.

BRIEF DESCRIPTION OF THE DRAWINGS

The invention will now be described in further details with reference to the accompanying drawing, being diagrammatical, and where FIG. 1, partly as a sectional view, shows the apparatus according to the invention viewed from the side.

DETAILED DESCRIPTION OF THE PREFERRED EMBODIMENT

Figure 1:
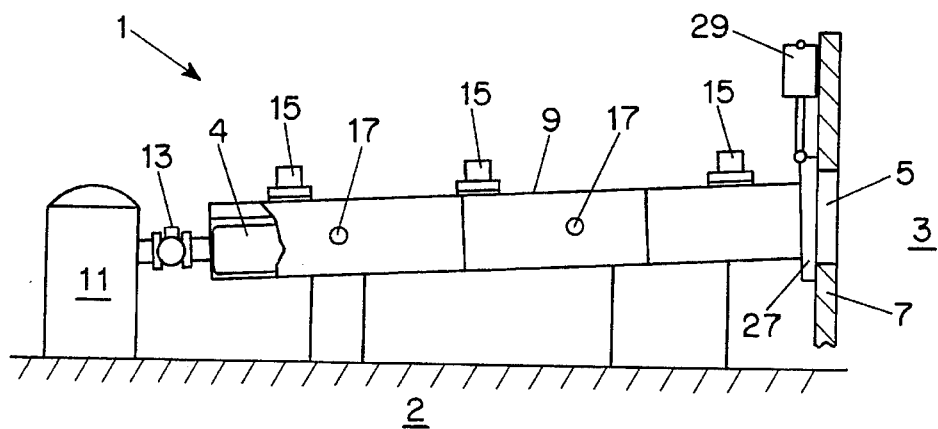

On the drawing is shown an apparatus 1 according to the invention for shooting whole automobile tires 4 into a cement rotary kiln 3 through an opening 5 in one end wall 7 of the kiln. The apparatus 1, which is placed on a horizontal platform 2 at one of the ends of the rotary kiln 3, comprises a gun barrel 9 with a rectangular cross-section and an air compressor 11 which, via a valve 13, is in communication with one another.

The apparatus further comprises means 15, such as self-locking spindle gears, hydraulic cylinders or the like, for adjusting the ceiling of the gun barrel, and a number of means 17 such as nozzles for introducing a lubricant, such as oil emulsion, soapy water or the like, in the gun barrel.

The apparatus may advantageously comprise a device (not shown) for weighing and measuring the tire before it is loaded in the gun barrel 9 by means of a charging device 19. The charging device 19 comprises, as is best illustrated in the FIGS. 2–5, a supporting device 21, which in the shown embodiments consists of a gravity conveyor and a pushing means 23 which, by use of a hydraulic cylinder 25 or the like, is movable between a charging position and a shooting position. The pushing means 23 in the FIGS. 2 and 3 consists of a plate and in FIGS. 4 and 5 of a rotary arm. In both embodiments, the pushing means 23, when placed in the shooting position and the apparatus being ready for shooting, is a part of the side wall of the gun barrel 9.

As is best illustrated in FIG. 1, the gun barrel 9 is inclined relative to the platform 2 so that the automobile tires can be shot ballistically into the kiln. Furthermore, the gun barrel 9 is positioned a certain distance away from the end wall 7 of the kiln in order to generate the space needed to enable a closing flap 27 to shut off the opening 5 between the shooting cycles by means of a device 29.

It is also contemplated that both the width and height of the barrel be adjustable. Adjustment of the side walls inwardly or outwardly, or of ceiling upwardly or downwardly, will cause, respectively, a corresponding change in the dimensions of the ceiling and side walls. For example, if the ceiling is lowered to decrease the height of the barrel, the height of the interior surface of the side walls of the barrel will be correspondingly lowered. This does not present a problem if the side walls are stationary, since the ceiling can simply slide up and down inside the side walls while maintaining close contact with the side walls, much as a piston slides in a cylinder.

Figure 6:
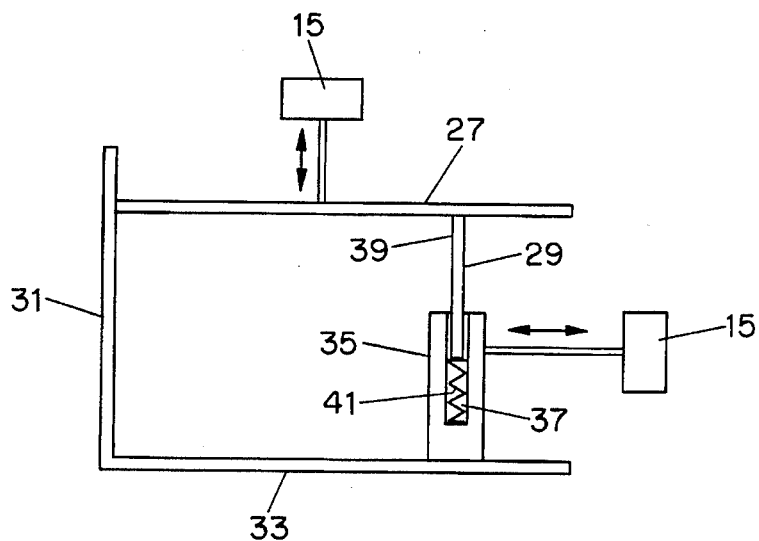
FIG. 6 shows an embodiment of the apparatus according to the invention wherein in both the width and height of the barrel are adjustable.

However, when adjustability of both height and width of the barrel is desired, means must be provided for maintaining a pressure seal since, unlike the situation with stationary side walls, the ceiling cannot simply slide up and down inside the side walls. Looking to FIG. 6, the ceiling 27 may be moved upwardly or downwardly by means 15, while side wall 29 may be moved inwardly or outwardly by similar means 15. Side wall 31 and bottom wall 33 remain stationary.

Since a lowering of ceiling 27 will cause the height of wall 29 to be lessened, means are provided to accommodate this change. As shown, this means comprises a lower wall portion 35 with a recess 37 to slidably receive an upper wall portion 39. Spring means 41 are provided to maintain the upper wall portion 39 and lower wall portion 35 tightly against the ceiling and bottom wall, respectively, even as the entire wall 29 is moved inwardly or outwardly. In this way, the height and width of the barrel may be adjusted while maintaining pressure-sealing contact between the side walls 29, 31, and the bottom wall 33 and the ceiling 27.

Figure 2:
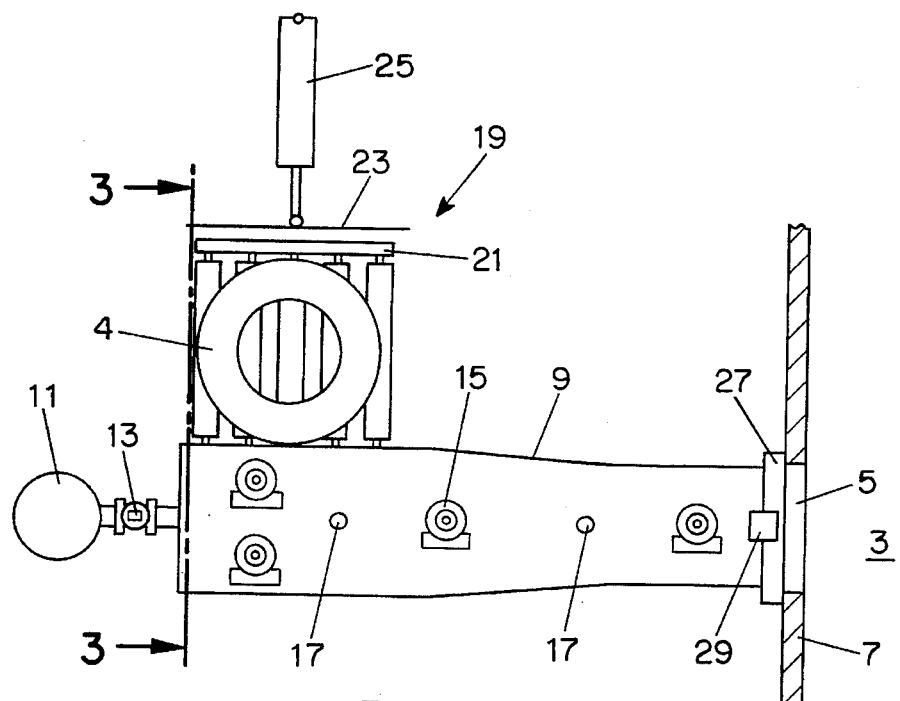
FIG. 2 shows a first embodiment of the apparatus according to the invention viewed from the top.
Figure 3:
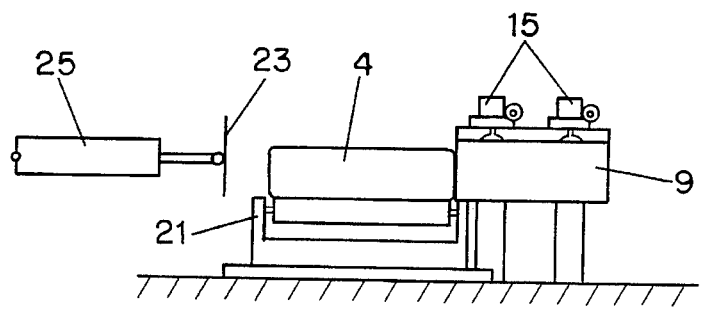
FIG. 3 shows the apparatus in FIG. 2 viewed in the direction of the intersection line 3—3.
Figure 4:
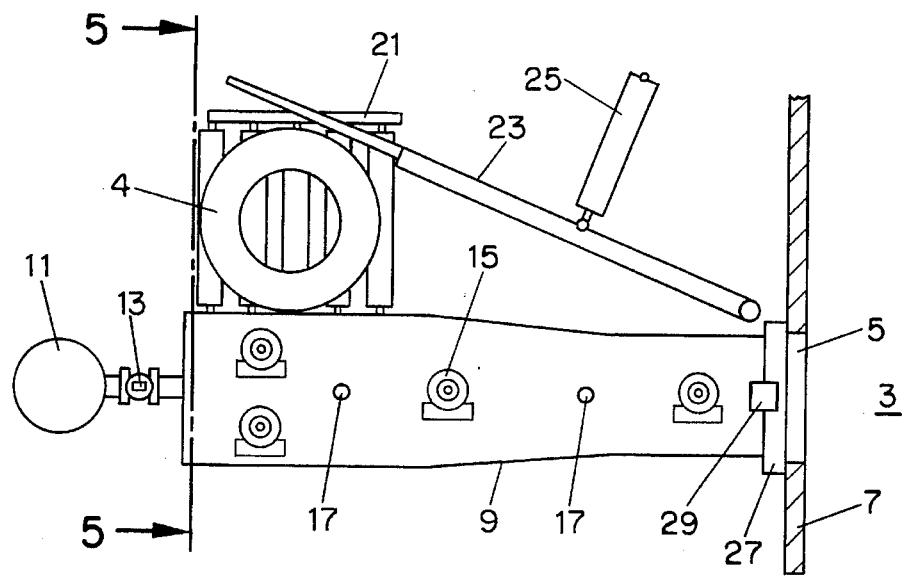
FIG. 4 shows a second embodiment of the apparatus according to the invention viewed from the top.
Figure 5:
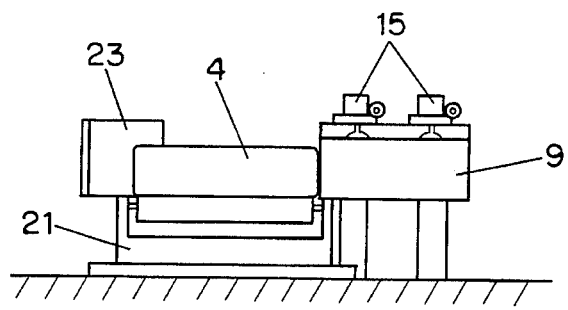
FIG. 5 shows the apparatus in FIG. 4 viewed in the direction of the intersection line 5—5.

It is seen from the FIGS. 2 and 4 that the gun barrel 9 is preferably designed with the largest cross-sectional width at the tire feed end and with the smallest cross-sectional width at the tire shooting end, and that it has an intermediate section where the cross-sectional width is reduced in the direction towards the shooting end. This design is intended to ensure effective guidance of the tire in the shooting end. As previously noted, this is due to the fact that the tire, because of the compression, is in close contact with the side walls of the gun barrel which function as guiding surfaces.

Effective guidance can also be obtained with parallel side walls, although loading may be somewhat more difficult due to the desired degree of compression along the entire barrel length. In this regard, and as noted above, it is preferred that in the embodiment wherein the side walls are substantially parallel, the barrel width/tire diameter ratio be about 1:2.

I claim:

1. An apparatus for shooting of whole automobile tires into a cement rotary kiln, said apparatus comprising a gun barrel with a tire feed end and a tire shooting end, charging means for placing automobile tires in the tire feed end of the gun barrel, means for generating compressed air for propelling the automobile tire through the gun barrel, said gun barrel comprising a tube having a cross-section which is essentially rectangular over its entire length.

2. An apparatus according to claim 1, wherein the gun barrel is wider in the tire feed end than in the tire shooting end.

3. An apparatus according to claim 2, wherein the gun barrel is divided into a first section at the tire feed end with the largest cross-sectional width, a second intermediate section where the cross-sectional width be reduced, and a third section at the tire shooting end with a smallest cross-sectional width.

4. Apparatus according to claim 3, wherein the feed end is dimensioned with a width which is between 2 and 20 per cent smaller than the largest tire diameter which is to be handled, and wherein the shooting end is dimensioned with a width which is between 2 and 20 per cent smaller than the smallest tire diameter which is to be handled.

5. Apparatus according to claim 1, wherein the tube includes side walls which are substantially parallel along the entire length of the tube.

6. Apparatus according to claim 5, wherein the ratio between the width of the tube and the diameter of the tire to be shot into the kiln is about 1:2.

7. Apparatus according to any one of claims 1 to 6, wherein at least one of the side walls of the gun barrel is movable in order that the gun barrel width can be adjusted.

8. Apparatus according to any one of claims 1 to 6, wherein characterized the ceiling of the gun barrel is movable in order that the gun barrel height can be adjusted.

9. Apparatus according to claim 7, including means for adjusting said at least one side wall of the gun barrel.

10. Apparatus according to claim 9, wherein said means include self-locking spindle gears or hydraulic cylinders.

11. Apparatus according to claim 8, including means for adjusting the ceiling of the gun barrel.

12. Apparatus according to claim 11, wherein said means include self-locking spindle gears or hydraulic cylinders.

13. Apparatus according to claim 8, wherein at least one of the side walls of the gun barrel is also moveable in order that both the height and the width of the gun barrel can be adjusted.

14. Apparatus according to claim 13, including means for adjusting the height of at least one side wall so as to conform to the height of the ceiling.

15. Apparatus according to claim 14, wherein said means for adjusting the height of the side wall comprises an upper side wall portion and a lower side wall portion, a recess in one of said portions for slidably receiving the other portion, and spring means for forcing the upper side wall portion against the ceiling and the lower side wall portion against the bottom wall.

16. Apparatus according to claim 1, further comprising means for introducing a lubricant into the gun barrel.

17. Apparatus according to claim 16, wherein said means are nozzles for introducing a lubricant.

18. Apparatus according to claim 17, wherein said lubricant is an oil emulsion or soapy water.

19. Apparatus according to claim 1, further comprising a device for weighing and measuring the tire before it is loaded in the gun barrel.

20. Apparatus according to claim 1, wherein the charging device comprises a supporting device and a pushing means which is movable between a charging position where an automobile tire, possibly by means of a propelling means, is transferred to the supporting device and an shooting position where the apparatus is ready for shooting, and in that the pushing means constitutes a part of the side wall of the gun barrel.

* * * * *